US006769213B1

(12) United States Patent
Cardarelli

(10) Patent No.: US 6,769,213 B1
(45) Date of Patent: Aug. 3, 2004

(54) MONUMENT IRRIGATION APPARATUS

(76) Inventor: Venanzio Cardarelli, 20 N. Triangle Dr., Plymouth, MA (US) 02360

( * ) Notice: Subject to any disclaimer, the term of this patent is extended or adjusted under 35 U.S.C. 154(b) by 0 days.

(21) Appl. No.: 10/463,151

(22) Filed: Jun. 18, 2003

(51) Int. Cl.[7] .......................... A01G 27/04; A01G 27/06
(52) U.S. Cl. .............................................. 47/80; 47/81
(58) Field of Search ............................ 47/79, 66.6, 80, 47/81

(56) References Cited

U.S. PATENT DOCUMENTS

| | | | | |
|---|---|---|---|---|
| 668,043 | A | 12/1901 | White ............................... | 47/3 |
| 1,060,970 | A | 5/1913 | Brown ............................ | 47/38 |
| 1,130,203 | A | 3/1915 | Schreyer ......................... | 47/38 |
| 1,982,432 | A | 11/1934 | Hull .................................. | 47/38 |
| 2,445,717 | A * | 7/1948 | Richards ......................... | 47/80 |
| 4,304,076 | A | 12/1981 | Splendora ..................... | 52/104 |
| 4,463,527 | A | 8/1984 | Schlosser ...................... | 52/103 |
| 5,014,472 | A | 5/1991 | Svensson ...................... | 52/103 |
| 5,081,790 | A * | 1/1992 | Hinton ............................. | 47/81 |
| 5,363,609 | A | 11/1994 | Hancovsky .................... | 52/103 |
| 5,546,710 | A | 8/1996 | Barry ............................. | 52/104 |
| 5,595,029 | A | 1/1997 | Revoir et al. .................. | 52/103 |
| 5,644,868 | A * | 7/1997 | Lui .................................. | 47/81 |
| 5,896,700 | A | 4/1999 | McGough .................... | 47/48.5 |
| 6,070,359 | A | 6/2000 | Liu .................................. | 47/79 |
| 6,219,963 | B1 | 4/2001 | Wang ............................ | 47/48.5 |
| 6,226,920 | B1 | 5/2001 | Myers ......................... | 47/48.5 |
| 6,276,090 | B1 * | 8/2001 | Lai .................................. | 47/79 |

FOREIGN PATENT DOCUMENTS

| | | | | |
|---|---|---|---|---|
| GB | 2095083 A | * | 9/1982 | .......... A01G/27/00 |
| JP | 2003061475 A | * | 3/2003 | .......... A01G/09/02 |
| WO | WO 02/074068 A1 | * | 9/2002 | .......... A01G/27/06 |

* cited by examiner

Primary Examiner—Son T Nguyen
(74) Attorney, Agent, or Firm—D. Michael Burns

(57) ABSTRACT

A water irrigation apparatus for watering plants and flowers at a cemetery monument location. The apparatus having a substantially hollow planter bed with an internal cavity for retaining and holding of water for distribution to the plant and flower soil. The planter bed having a sponge embedded on an interior surface to provide for the metered release of moisture to the plants and flowers on an as need basis.

17 Claims, 4 Drawing Sheets

MONUMENT IRRIGATION APPARATUS

BACKGROUND OF THE INVENTION

1. Field of the Invention

The present invention relates generally to an irrigation apparatus that is designed to provide a constant source of irrigation to surrounding plants, flowers, and other vegetation. More specifically, to a planter vase which works in conjunction with a cemetery monument or as individual units. The apparatus is designed for the storage of water and its delivery to the surrounding flowers and plants automatically on an on need basis.

2. Description of the Prior Art

A number of designs have been provided in the prior art for automatically watering plants and flowers. These watering devices generally are either of the type that supplies a continual flow of water to the plants or the type that supplies water on an intermediate basis depending on a moisture feedback system.

The scarcity of skilled stone cutters that are usually required to prepare and inscribe monuments has caused large numbers of bereaved families to seek alternate means of for tombstone markers for the repose of their loved ones. Today, because few, if any of the granite quarries in the United States are operational, it is now necessary that pre-cut stones are shipped from overseas to the United States. This is an extremely costly procedure, often accounting for more than 50% of the total funeral expenses. The future of the monument industry lies is the industrial prefabrication of cast or molded memorials. Examples of such are seen in the prior art. U.S. Pat. No. 4,463,527, issued to Schlosser on Aug. 7,1984, describes a polyhedral monument which can be constructed from materials being suitable for storage of grave maintenance items and also for the storage of water. The capture by the monument of rainwater is described and would be a major source of water replenishment.

The storage of water, and in particular the capturing of rainwater, is discussed in the following U.S. Pat. No. 1,982, 432 issued to Hull on Nov. 27, 1934; and 688,043 issued to White on Dec. 3, 1901. Having molded monuments has been discussed in the prior art and particularly with U.S. Pat. No. 5,595,029 issued to Revoir et al. on Jan. 21, 1997. This patent teaches the use of moldable polymeric plastic materials to manufacture the monument and it appears that this may well be the future of the monument industry. Both cast and moldable monuments are visualized as manufacturing methods of the present invention.

In conjunction with the above molded or cast monuments, the application of watering devices is seen as the most important innovation is the monument industry. This allows for loved ones to better maintain the graves. The prior art recites numerous patents that teach of watering devices. One such patent is U.S. Pat. No. 5,921,025, issued to Smith on Jul. 13, 1999, wherein a self-watering plant pod is shown and described. Others that illustrate such self-watering devices are: Liu's U.S. Pat. No. 6,070,359, which was issued on Jun. 6, 2000; U.S. Pat. No. 5,896,700 issued to McGough on Apr. 27, 1999; and U.S. Pat. No. 6,219,963 issued to Wang on Apr. 24, 2001. These devices are all examples of pot type designs that utilize mechanical means to regulate the flow or drip to the plant. The present invention introduces a novel means for regulating the flow of irrigation water.

None of the above inventions and Patents, taken either singly or in combination, is given to describe the instant invention as claimed.

SUMMARY OF THE INVENTION

Accordingly, an embodiment of the present invention provides an improved monument and irrigation apparatus. It includes the combination of features, such as a monument vase, a water containing cylinder and planter bed to provide an automatic irrigation system not found in prior art headstones or monuments. And, which when combined synergistically to provide a monument which will cost but a fraction of the price of a conventional granite headstone.

An embodiment of the present invention is a metallic central water reservoir that is surrounded by resinous, acrylic, or polymeric materials of the monument. A central water reservoir is simply a void in the headstone of a moldable headstone wherein water may be replenished by a water supply or captured rainwater.

An embodiment of the invention provides for an internal metallic system to provide greater stability and strength to the system, whether full or empty, than will a purely moldable headstone. The metallic structure is designed to have means for bolting to a base slab.

Another embodiment of the invention provides for a planter bed and cylinder water reservoir in combination to better control the regulation of water to the plants. The planter bed, having an improved design, can be employed in combination with the monument. The design of the planter bed vase may be rectangular, cylindrical or some other shape that will handle the weight without any distortion to the structure. An inventive concept is the use of a sponge disposed on the internal surface of the planter bed vase to keep the soil moist for longer periods of time. The sponge actually absorbs excess moisture and as the soil dries, the sponge can then release water to the soil over an extended period of time. The sponge can be recessed into the interior surface of the planter bed for greater stability ad durability.

Yet still another embodiment of the invention incorporates a directional concavity of the upper edge of the planter bed for gathering of rainwater. The same fill area will also allow for the filling of the reservoir by an individual. The size and shape of the planter bed and the amount of water held therein will be a function of the scope of the landscape, plants and flowering beds requiring irrigation.

An embodiment of the invention absorbs the drainage water with a sponge bed disposed on the bottom layer of the vase. This allows the soil to take moisture from the sponge on an as needed basis. However, in lieu of the sponge, granules such as that marketed under the trade name "Soil Moist", which is a polymer designed to reduce plant watering, can be dispersed into the vase soil, preferably near the plant roots. These granules absorb water similar to a sponge and upon the soil drying, the stored water is then released to the soil over an extended period of time on an as need basis. The granules also function in absorbing any excess water and storing it until needed.

An embodiment of the invention uses a cylinder reservoir that can function in conjunction with the headstone and/or the planter bed to provide a gravity-aided flow of water. The design of the cylinder prevents the accumulation of standing water, as well as directing the water into the irrigation lines. The cylinder reservoir, by being placed in front and somewhat lower than the headstone, which is the main reservoir for water, allows water to flow on an as needed basis to the planted bed vase.

DETAILED DESCRIPTION OF THE INVENTION

Figure 1:
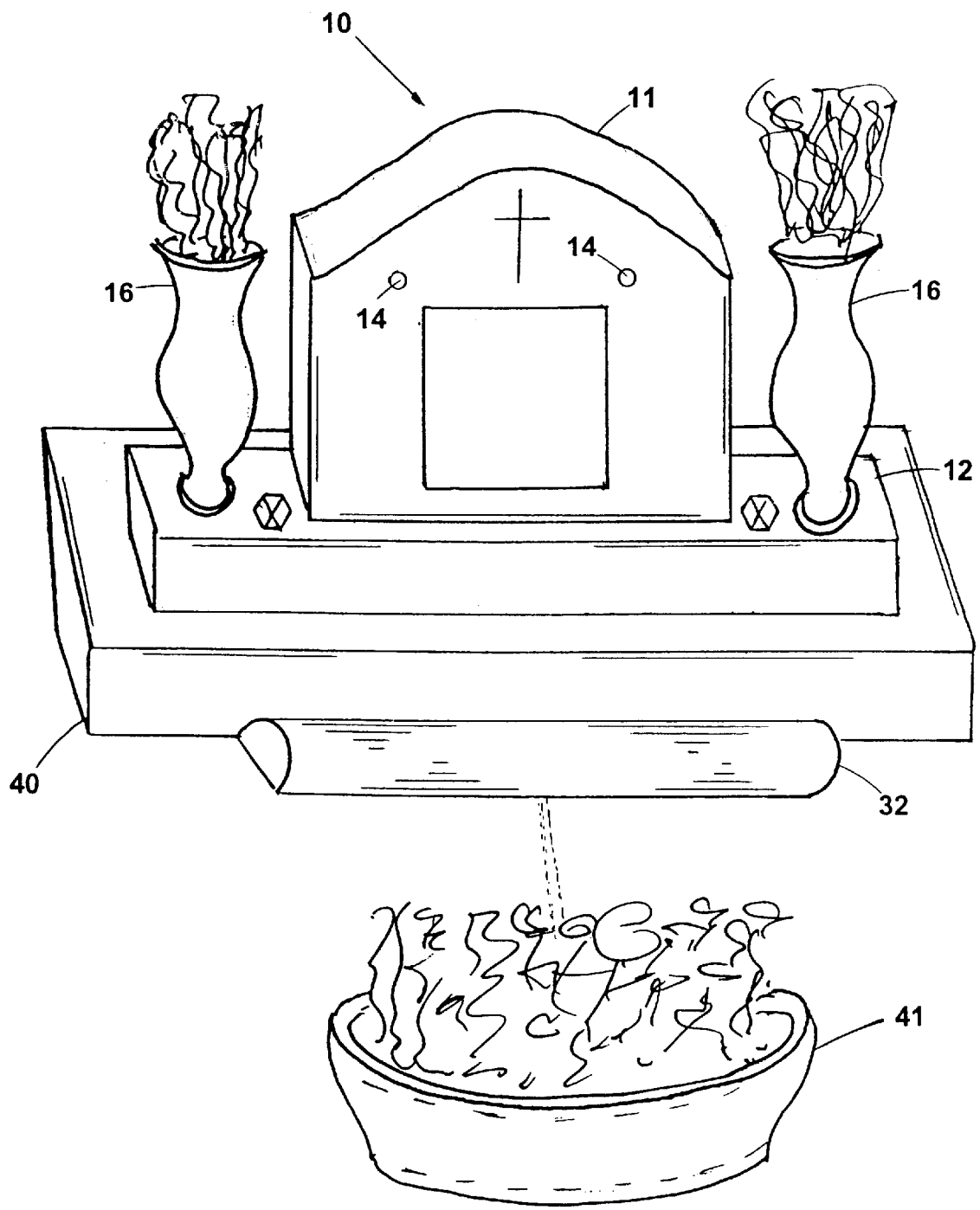
FIG. 1 is a pictorial view of a cemetery monument of the present invention.
Figure 2:
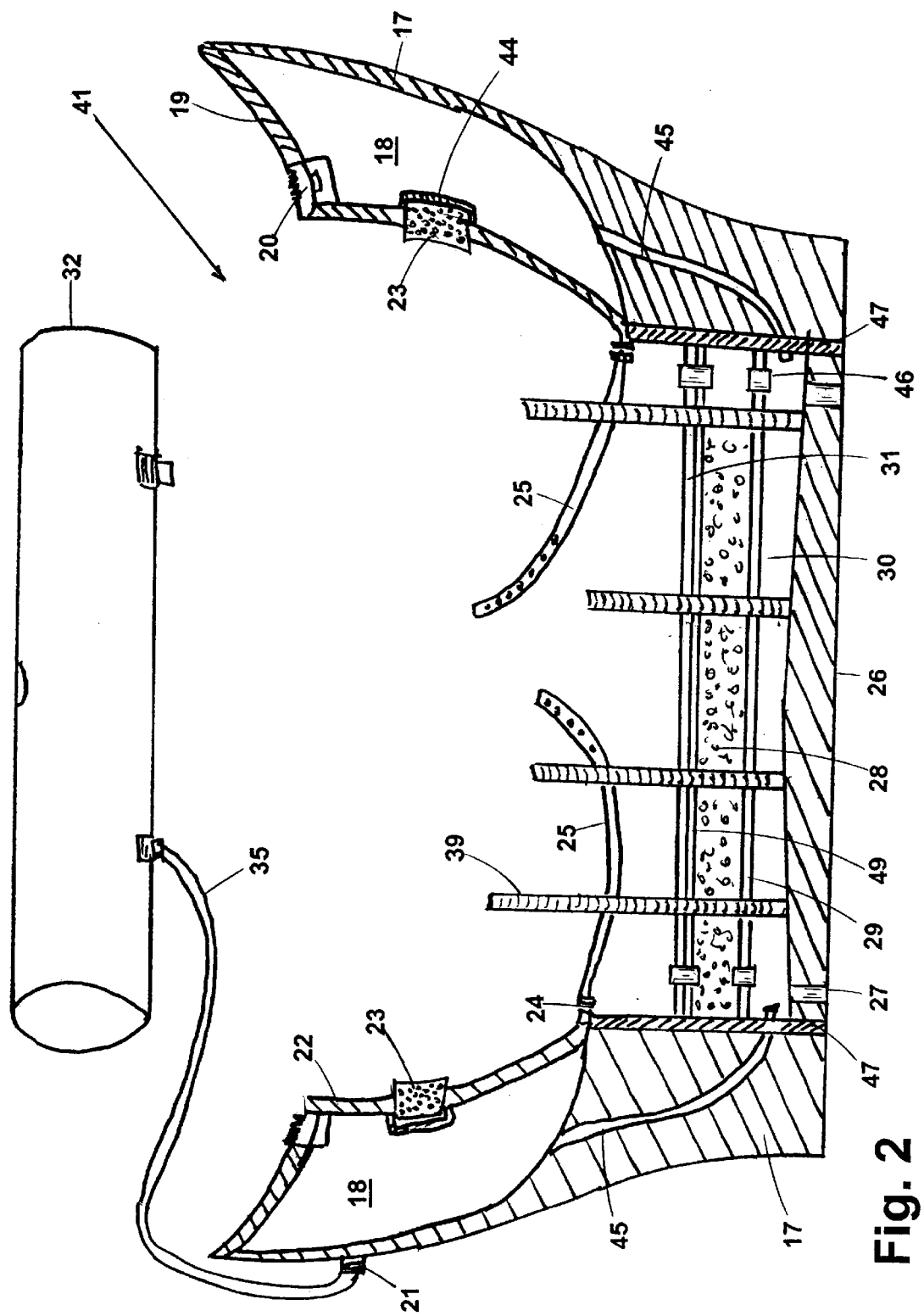
FIG. 2 is a sectional view of the planter bed of the present invention.
Figure 3:
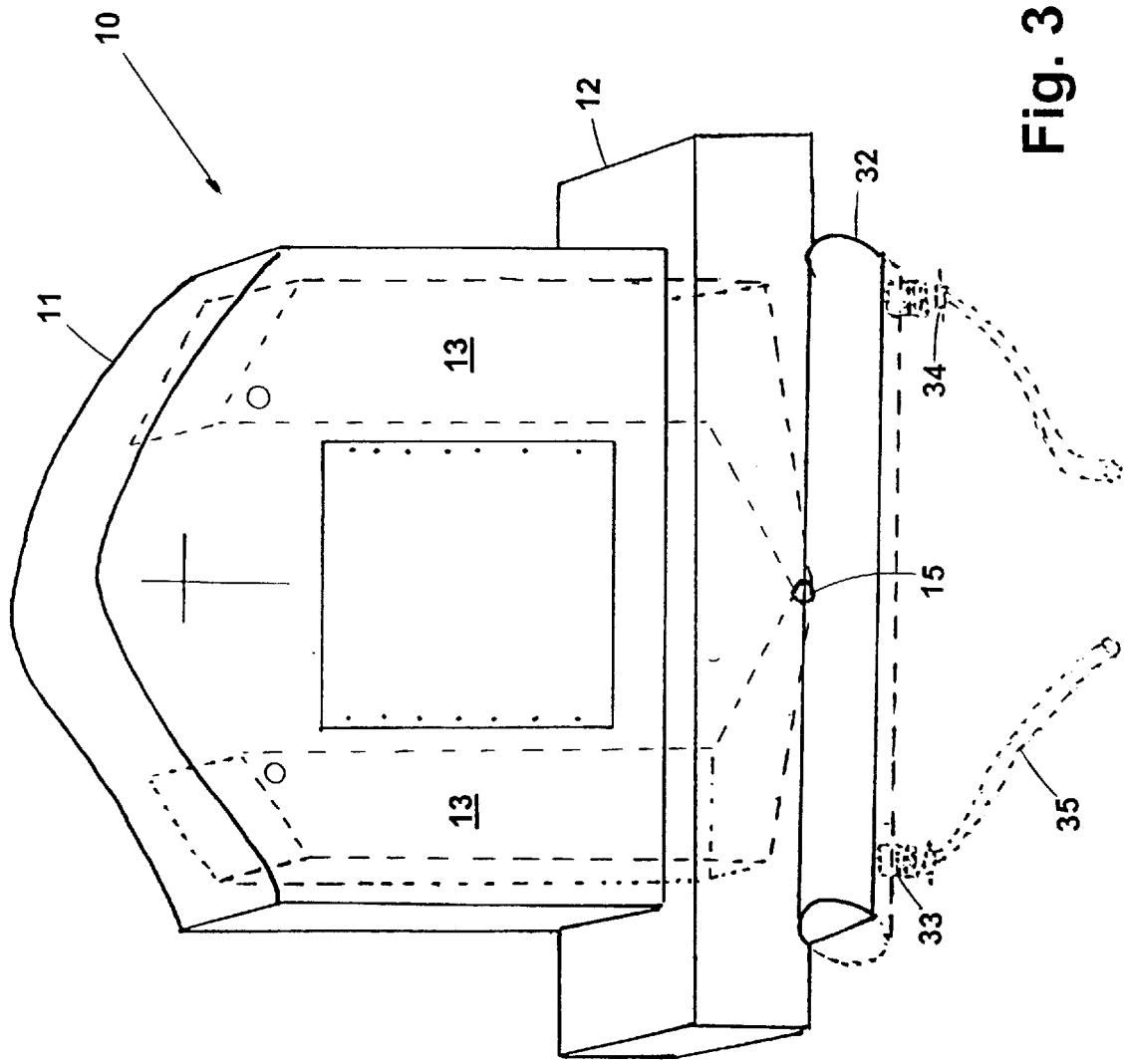
FIG. 3 is a pictorial view of the gravity flow system from the water reservoir tank within the monument to the cylindrical reservoir.

The present invention combines two types of supplying water to a plant. It allows for the continual and automatic watering of plants and flowers and also permits the regulation of a continual flow (depending on a moisture feedback system). The invention utilizes an improved planter bed design that can supply water firstly, at a constant flow, secondly by an I.V. drip design and thirdly, upon detection of the moisture in the soil. The present invention utilizes the monument itself as a water supply.

An embodiment of the present invention is shown in FIGS. 1–5, wherein a monument 10 comprising of a headstone 11 conjoined with a base 12 that is therein bolted to a cement slab 40. The headstone 11 can be cast metal, acrylic, resinous, polymeric or molded thermoset polyurethane, or a combination thereof. The interior of the headstone 11 can be a metallic water tank 13 disposed within a moldable cast material. The water tank 13 may be an independent structure such as a metal container within the headstone 11, or can be a void defined within a substantially hollow headstone 11 with the remaining structure of the headstone 11 made from more solid material that is capable of withstanding weather conditions. The water tank 13 as seen on FIG. 3, can be refilled through water intake openings 14 as shown on FIG. 1, while the water exits through a water gate 15 at the bottom of the monument 10. The water gate 15 can be connected to a variety of fittings i.e. Y-type, L-type, or a host of other types that are readily available at any hardware store.

Lines can be connected to distribute the water to the surrounding flower beds, and whether it be directly or indirectly, the lines may be connected through a cylinder reservoir 32 or a planter bed 41. The rate of flow is to be controlled by drip valves (discussed later). The monument 10 may include auxiliary water supply means such as vases 16, which may be adjacently positioned and mounted by conventional means such as bolted to the cement slab 40.

The vases 16, as depicted in FIG. 1, are capable of being independent water sources or can be used in conjunction with the water tank 13 or connected to the cylinder reservoir 32, which supplies water directly to the planter bed 41.

The planter bed 41 will have a frame 17 that defines a cavity 18 for retaining and storing water. The upper portion of the planter bed 41, which in addition to a water intake hole 20 has defined therein a concave groove 19 that will allow rainwater to collect and subsequently enter the cavity 18. Although not shown, the headstone 11 may also include an upper portion that has a collection type surface for gathering rainwater in order to supplement the manual addition of water. The design of the planter bed 41 may take many shapes, rounded, rectangular or polyhedral. The inventive concept not limited to any particular shape.

The water intake hole 20 includes means for filtering and sifting any miscellaneous unwanted matter such as leaves, dirt or other airborne objects. The frame 17 of the planter bed 41 may be metal or sturdy polymer plastic or other material that will endure a rugged outdoor environment. The planter bed 41 may be connected to the base 12 by a connection valve 21 interposed on the side or rear of the planter bed 41, in order to secure a constant flow of water. The bed 41 may also be connected to either/both the cylinder 32 or vases 16. The planter 41 has an interior surface 22, wherein a sponge 23 is positioned around the entire inside perimeter of the bed 41. The sponge 23 serves as a water retention medium and is positioned in the interior surface 22 within a slotted ring 44 support. The sponge 23 keeps the soil within the bed 41 moist for extended periods of time. The water flows by gravity from the cavity 18 of the frame 17 and the rate of flow is controlled by a regulation valve 24. A plurality of irrigation lines 25, which may be porous, distributes the water to the soil.

The bottom portion of the planter bed 41 comprises at least one drainage hole 27 to allow excess water to be removed from it. A water storage basin 30 lies immediately above the bottom of the frame 17, and is in direct contact with the voided area 18 by a plurality of by-pass hoses 45. A first screen 29 separates the water storage basin 30 from a sponge layer 28. Immediately above the sponge layer 28 is a second screen 49 for sifting out any miscellaneous items that may slip by from a base layer 31, which supports the soil and any growth objects therein. A multitude of seepage holes 46 are dispersed within screens 29 and 49. The base layer 31 includes porosity areas that may allow the placement of absorbing particles, which garner moisture from the sponge layer 28 while also inhibiting or preventing soil on the base layer 31 from drifting into the sponge layer 28. A plurality of wicks 39 transverse through the water storage basin 30, the sponge layer 28 and through the base layer 31. The wicks 39, or other absorbing mediums, function by re-circulating the water from the storage basin 30 through the sponge layer 28 and therein remoisturizing the soil. The base layer 31 may also have projections (not shown) that may penetrate into the sponge layer 28, such that the soil in the base layer 31 gathers moisture from the sponge layer 28.

Water capturing granules such as "Soil Moist", a polymer designed to reduce plant watering, is manufactured by J.M.C. Chemical Company and may be used in lieu of, or in conjunction with the sponge 23 on the interior surface of the frame 17, or in the sponge layer 28. The polymer absorbs water similar to a sponge. And, when the soil begins to dry-up, the water stored in the granules is released to the soil over an extended period of time through a unique blend of coconut fibers and peat moss that release water slowly to help reduce plant stress.

Figure 4:
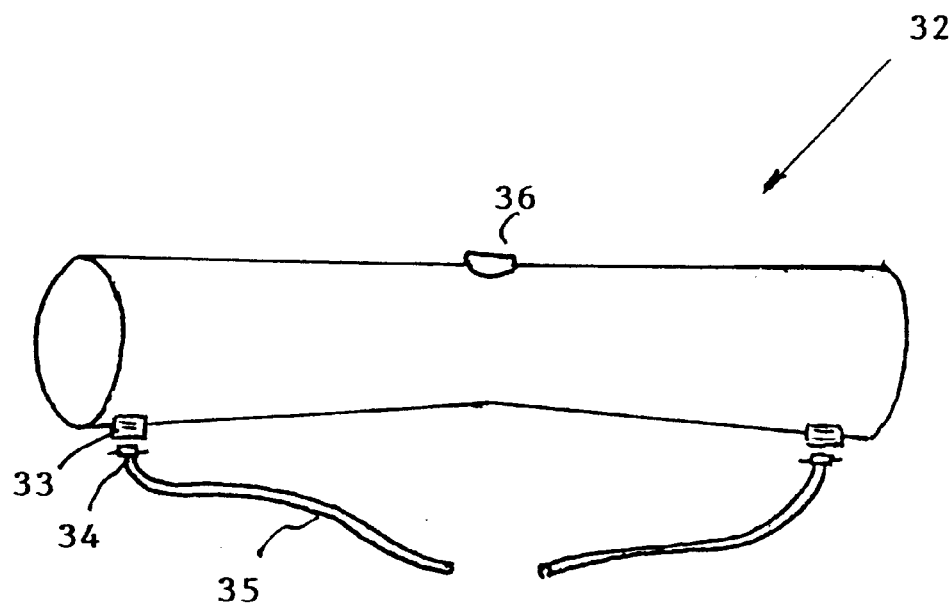
FIG. 4 is a frontal view of a cylindrical reservoir having water irrigation lines leading away from the ends of the cylinder.
Figure 5:
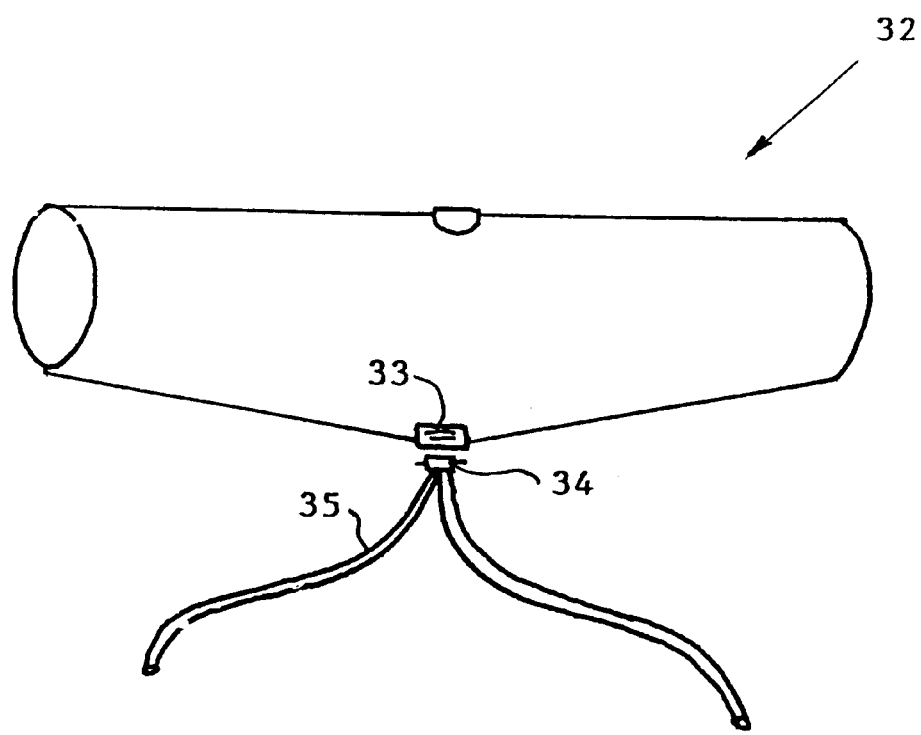
FIG. 5 is a frontal view of the cylindrical reservoir having water irrigation lines leading from the central portion of the cylinder.

The water in the cylinder 32 cooperates with the water in the headstone 11. As shown in FIGS. 4 and 5, the water can be directed to the surrounding area through exit valves 33, and then to drip valves 34, which can regulate the flow rate therein. The valves 33 and 34 are made from zinc or copper metallic threads. Distribution lines 35 direct the water to the planter bed 41. The water cylinder 32 can be filled directly from the water supply in the headstone 11 or by manual filling through a water plug 36. Two types of cylinders are depicted in FIGS. 4 and 5. In FIG. 4, the water flows from the ends of the cylinder 32, while in FIG. 5, the water is distributed from the middle portion of the cylinder 32. It is to be appreciated that the cylinder 32 may be of any shape including a rectangular cross-section.

The frame 17 of the planter bed 41 has a removable sleeve 47, whereby the components comprising the water storage basin, the sponge layer 28, first and second screens 29 and 49, and the base layer 31 may be removed for periodic cleaning or replacement.

I claim:

1. A irrigation apparatus for watering plants and flower soil about a cemetery monument, the apparatus comprising:

a planter bed having a substantially hollow frame, the frame having a cavity defined therein for retaining and storing a water supply;

an upper portion of the frame comprising a concave groove for collecting rainwater, a water intake hole disposed in the groove having means for filtering and sifting miscellaneous unwanted matter;

the frame having a sponge disposed on an interior perimeter surface, the sponge serving as a water retention medium for keeping plant and flower soil moist for an extended period of time;

a lower portion of the frame comprising: a base layer for supporting the soil, a second screen providing support for the base layer and for sifting out any miscellaneous matter from the soil above it, a sponge layer directly beneath the second screen, the sponge layer having water capturing granules for slowly releasing water to a dried-up soil over an extended period of time to reduce plant stress, a first screen positioned directly beneath to support the sponge layer, and a water storage basin positioned directly beneath first screen and in direct contact with the water supply of the cavity;

a multitude of seepage holes defined in the first and second screens for providing passage of excess water from the soil to the water storage basin; and a plurality of absorption devices traversing from the water storage basin to the base layer for re-circulating water on an as need basis to the soil in the base layer.

2. The apparatus of claim 1, wherein the frame is made of metal.

3. The apparatus of claim 1, wherein the frame is made of a polymeric plastic.

4. The apparatus of claim 1, wherein the frame comprises a removable sleeve, the sleeve comprising:

the water storage basin;

the sponge layer;

the base layer; and first and second screens, wherein the sleeve may be removed for the cleaning or replacement of contents.

5. The apparatus of claim 1, wherein the absorption devices are wicks.

6. The apparatus of claim 1, wherein a plurality of porous irrigation lines distribute water from the cavity to the soil in the base layer, the distribution controlled by a regulation valve.

7. The apparatus of claim 1, wherein the planter bed is supplied water from a substantially hollow headstone, the headstone comprises a water tank disposed therein, the headstone having means for supplying water to the planter bed.

8. The apparatus of claim 1, wherein the planter bed is supplied water from an additional reservoir.

9. The apparatus of claim 8, wherein the additional reservoir is a cylindrical tank having means for automatically regulating the flow of water to the planter bed.

10. A cemetery monument having an irrigation apparatus for watering plant and flower soil of a planter bed, the monument comprising:

a substantially hollow headstone having a water tank defined within the headstone the planter bed having a substantially hollow frame, the frame having a cavity defined therein for retaining and storing a water supply;

means connecting the water tank to the water supply cavity;

an upper portion of the frame comprising a concave groove for collecting rainwater, a water intake hole disposed in the groove having means for filtering and sifting miscellaneous unwanted matter;

the frame having a sponge disposed on an interior perimeter surface, the sponge serving as a water retention medium to keep plant and flower soil moist for an extended period of time;

a lower portion of the frame comprising: a base layer for supporting the soil, a second screen providing support for the base layer and for sifting out any miscellaneous matter from the soil above it, a sponge layer directly beneath the second screen, the sponge layer having water capturing granules for slowly releasing water to a dried-up soil over an extended period of time to reduce plant stress, a first screen positioned directly beneath to support the sponge layer, and a water storage basin positioned directly beneath first screen and in direct contact with the water supply of the cavity;

a multitude of seepage holes defined in the first and second screens for providing passage of excess water from the soil to the water storage basin; and a plurality of absorption devices traversing from the water storage basin to the base layer for re-circulating water on an as need basis to the soil in the base layer.

11. The monument of claim 10, wherein the frame of the planter bed and headstone are both made of metal.

12. The monument of claim 10, wherein the frame of the planter bed and headstone are both made of a polymeric plastic.

13. The monument of claim 10, wherein the frame of the planter bed comprises a removable sleeve, the sleeve comprising:

the water storage basin;

the sponge layer;

the base layer; and first and second screens, wherein the sleeve may be removed for the cleaning or replacement of contents.

14. The monument of claim 10, wherein the absorption devices comprise of plurality of wicks.

15. The monument of claim 10, wherein a plurality of porous irrigation lines distribute water from the cavity to the soil in the base layer, the flow of water controlled by a regulation valve.

16. The monument of claim 10, wherein a water retention medium is embedded on the perimeter of an interior surface of the frame to keep the soil moist for extended periods of time.

17. The monument of claim 10, wherein the monument further includes an additional water reservoir interposed between the monument and the planter bed.

* * * * *